United States Patent [19]

Kosaka et al.

[11] Patent Number: 5,161,103
[45] Date of Patent: Nov. 3, 1992

[54] REAL TIME STATUS MONITORING SYSTEM

[75] Inventors: Michitaka Kosaka, Sagamihara; Toshiro Sasaki, Tokyo; Kuniaki Matsumoto, Tokyo; Kichizo Akashi, Ebina; Satoru Suemitsu, Kawasaki, all of Japan

[73] Assignee: Hitachi, Ltd, Tokyo, Japan

[21] Appl. No.: 376,122

[22] Filed: Jul. 5, 1989

[30] Foreign Application Priority Data

Jul. 8, 1988 [JP] Japan .................. 63-168702

[51] Int. Cl.$^5$ ............................ G06F 15/00
[52] U.S. Cl. ...................... 364/408; 364/401
[58] Field of Search ................ 364/408, 401

[56] References Cited

U.S. PATENT DOCUMENTS 3,794,981  2/1974  O'Connor ............ 364/200
4,334,270  6/1982  Towers .............. 364/408 X

FOREIGN PATENT DOCUMENTS 2180380A  7/1982  United Kingdom .

OTHER PUBLICATIONS

PORTIA and PORTIA SA Software Program, Technical Data Software, Thomas Financial Networks, Boston, Mass. Product Description, Jan. 1987.
Real-Time Investment Portfolio Analysis System Software Program, Real-Time USA Inc., Oakbrook Terrace, Ill., Product Description, 1982.
Roberts, S. "Multi Makes the World Go Round", *Wall Street Computer Review*, vol. 6, No. 6, Mar. 1989, 26(8).
Kosaka, et al., "Improvement in Correlation Precision in Status Inference Using Multi-Sensors", System and Control, vol. 27 (1983).
"A Track Correlation Algorithm for Multi-Sensor Integration" IEE/AIAA 5th Digital Avionics Conference, 1983, pp. 10.3.1–10.3.8.

*Primary Examiner*—Dale M. Shaw
*Assistant Examiner*—Andrew Bodendorf
*Attorney, Agent, or Firm*—Fay, Sharpe, Beall, Fagan, Minnich & McKee

[57] ABSTRACT

A real time status monitoring method for inputting randomly varying data relating to a plurality of objects, processing a plurality of functions having some of the data as variables and monitoring an overall status including the objects on a real time basis, and an apparatus therefor are disclosed. A table indicating the presence or absence of data change in the objects and the presence or absence of variables related to the data change in the funtions is prepared. In processing the functions, the table is referenced and only those functions which include the variables related to the data change are processed.

11 Claims, 13 Drawing Sheets

F I G. 3A
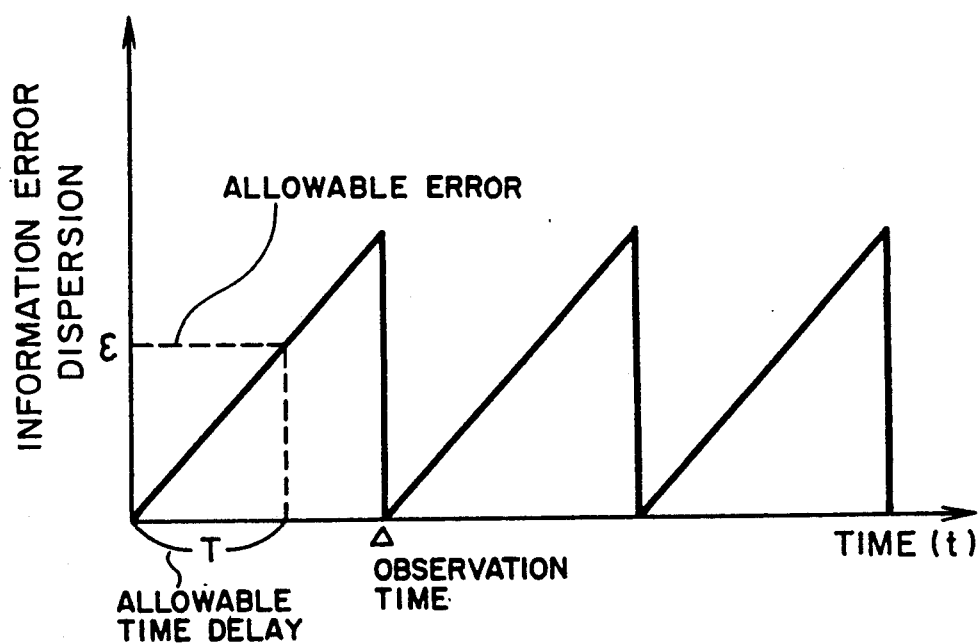
F I G. 3B
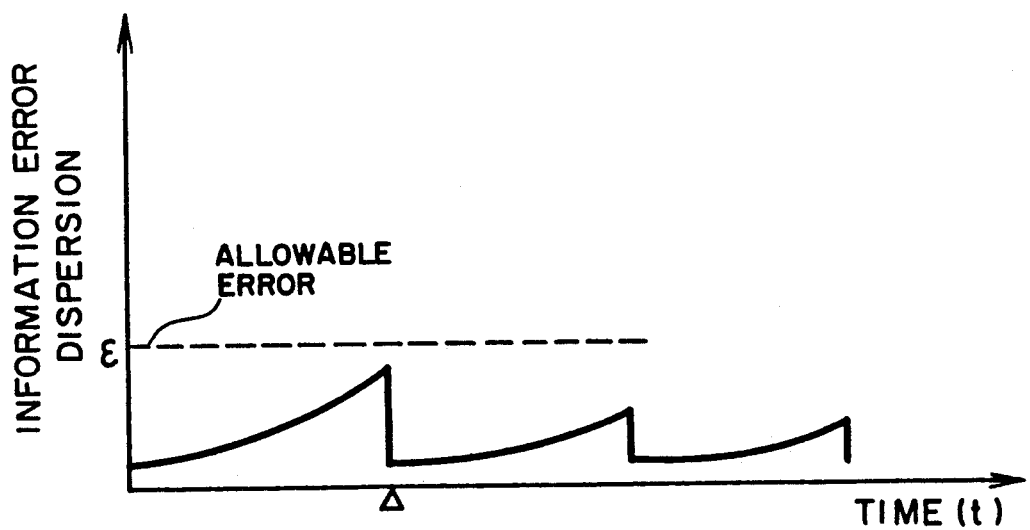

FIG. 4

| | | F1 | F2 | F3 | | | | Fn | PRICE CHANGE FLAG | CURRENT PRICE |
|---|---|---|---|---|---|---|---|---|---|---|
| | M1 | w11 | w12 | 0 | | | | | 1 | P1 |
| | M2 | 0 | | | | | | | 0 | P2 |
| | M3 | 0 | | 0 | | | | | 0 | P3 |
| | | 0 | | | | | | | 1 | |
| | | | | | | wij | | | | |
| | | | | | .... | | | | | |
| | Mm | wm1 | | | | | | | 0 | Pm |
| CURRENT TOTAL AMOUNT UPDATING | | 1 | 1 | 0 | | | | | | |
| CURRENT TOTAL AMOUNT | | | | f3 | | | | | | |
| GUARANTEED TOTAL AMOUNT | | | | g3 | | | | | | |

(columns F1..Fn labeled PORTFOLIO NAMES; rows M1..Mm labeled FIRM)

DECISION MAKING SUPPORT INFORMATION
DECISION MAKING SUPPORT INFORMATION UPDATING

⟨DECISION MAKING SUPPORT PROCESSING TABLE⟩

- DECISION MAKING SUPPORT INFORMATION
- INFORMATION COMPRISING ONLY PAST TIME SERIAL DATA OF $(Fj)P$
- DECISION MAKING SUPPORT INFORMATION UPDAING FLAG

FIG. 11

| | | CORRELATION FUNCTION | | | PRICE CHANGE FLAG | CURRENT PRICE |
|---|---|---|---|---|---|---|
| | $r_1$ | $r_2$ | | $r_n$ | | |
| $M_1$ | 1/m | 0 | | | 1 | $P_1$ |
| $M_2$ | | | | | 0 | $P_2$ |
| | | | | | 0 | $P_3$ |
| | | | | | | |
| $M_m$ | | | | | | |
| $y_o$ CHANGE FLAG | 0 | 1 | | 0 | | 0/1 ← $x_o$ CHANGE FLAG |
| $y_o$ | | | | | | $x_o$ |
| $A^3$ | | | | | | $A_i^2$ |
| $x_o y_o$ | | | | | | |
| $A^1$ | | | | | | |
| $r_i$ | | | | | | |

FIRM

REAL TIME STATUS MONITORING SYSTEM

BACKGROUND OF THE INVENTION

The present invention relates to a real time status monitoring method and an apparatus therefor, and more particularly to a data processing method in a real time status monitoring system which determines a status and makes a decision on a real time basis based on a huge amount of data information which randomly varies with respect to an object, and a system therefor.

Specifically, the present invention is applicable to a trading support system based on market quotation in financial and security fields, a support system for measurement, monitor, control and decision making, comprising a number of sensors, and a support system for status determination and decision making for aviation control or traffic control.

While the present invention is applicable to various fields, it will be explained as a trading support system in the financial and security field.

An outline of the support system for making a decision in accordance with status such as the trading support system in the financial and security field is shown in FIG. 12, in which market quotation information which contains a huge number of varying stock and credit prices is received by a receiver 1, and the latest data to be monitored is supplied to a real time status sensing table 2 in a system. Two kinds of data bases are provided corresponding to kinds of informations. Namely, a time serial data base 4 which contains market quotation information and a data base 5 which contains information necessary for decision making support processing, for example, portfolio data of financial assets, are provided. Based on the market quotation status, a decision making support processor 3 evaluates the asset portfolio on a real time basis, determines buying and selling timing by a moving mean method, generates support information for reassembling the asset portfolio, and outputs them to a display unit 6. By combining the real time status sensing table 2 with the data stored in the data base 4 at a desired time in a desired form, information for most effective decision to a decision maker can be generated and provided in accordance with the status. In this case, there is a time delay between the reading of the market quotation information and the display of the information to the decision maker. It is important to reduce the time delay as much as possible.

As a real time processing method applicable to solve the above problem, a known multi-target tracking processing method may be used. In this method, multi-targets to be monitored are observed at a constant time interval and status inferences of all of the multi-targets are updated based on the observation. ("Improvement in Correlation Precision in Status Inference Using Multi-Sensors" by Kosaka et al., SYSTEM AND CONTROL, Vol. 27, No. 8 (1983), "A track correlation algorithm for multi-sensor integration" IEEE/AIAA 5th DIGITAL AVIONICS SYSTEMS CONFERENCE, Oct. 31-Nov. 3, 1983, PP. 10.3.1-10.3.8). In the known multi-target tracking processing, the status changes of all targets to be monitored are always due to the movement by a physical law. Thus, the status of the target at any time can be predicted by a Kalman filter within a certain range of error even if the observation and the status inference are done at the constant time interval. Accordingly, it is an effective processing method in an aviation control system and a command and role system.

The above method may be applied to the decision making support processing of the trading support system shown in FIG. 12. It is assumed that the market quotation information (stocks and credits whose data are varying and prices thereof) has been stored in the real time status sensing table. Decision making support information processing groups {Fi} are processed at a constant time interval as shown in FIG. 2. All information processing groups {Fi} are processed in accordance with the content of the real time status sensing table 2 at a time Ti, and the results are supplied to the display unit. The same processing is performed to the content of the real time status sensing table at a time $T_{i+1}(=Ti+\Delta T)$ which is $\Delta T$ time later than the time Ti. The time $\Delta T$ must be larger than a sum of processing times for all information processing groups.

SUMMARY OF THE INVENTION

It is an object of the present invention to provide a real time status monitoring method which includes less time delay between data input and decision making based on the data, and an apparatus therefor.

It is a specific object of the present invention to provide a real time status monitoring method which receives data relating to a number of objects of different kinds which vary randomly, processes a plurality of functions having data of a portion of the objects as variables and monitors an overall status including the objects on a real time basis, and an apparatus therefor.

The above objects are considered by the inventors in the study about the real time status monitoring method and apparatus. The content of the study is described hereinafter.

In the processing method, it is easy to control the information processing, but the following problem may arise in the trading support system where a huge number of objects are monitored and the data to be monitored change randomly. Of the huge number of objects, there are many objects whose data do not change during the given time period $\Delta T$. Thus, unnecessary calculation process may take place in spite of the fact that the processing result is the same as the previous one. Since the updating time interval $\Delta T$ must be larger than the sum of the processing times for all decision making support processings, there occurs a time delay for the generation of the decision making support information. In the case of market quotation information such as stocks and credits, this time delay is a very significant factor and degrades the information because no prediction can be made for a future status as it is done for the tracking processing. As described in many references, if the price change in the market quotation occurs in a random walk manner, an error dispersion of the price is expressed by $\sigma^2 T$ which monotonously increases with the increase of the time delay T. On the other hand, in the case of tracking processing, the prediction error of the prediction processing is increased by the time delay T but the effect is much smaller than that in the status monitoring of the market quotation without the prediction processing. The information error transitions due to the time delay in the status monitoring of the market quotation and in the tracking processing are shown in FIGS. 3A and 3B, respectively. Where the huge number of objects are to be monitored and the changes of data occurs randomly, it is necessary to realize a real time decision making supporting information processing method which can avoid the unnecessary processing described above, in order to reduce the updating process time interval ΔT.

The present invention realizes a system which receives data relating to a number of objects of different kinds, processes a plurality of functions having data of a portion of the objects as variables and monitors an overall status including the objects on a real time basis.

The above objects of the present invention are achieved by a system which receives, the randomly varying data of a plurality of objects, processes a plurality of functions having some of the data as variables, and monitors the overall status including the objects on the real time basis. The system comprises a table which represents the presence or absence of change of data of the objects and the functions which includes the variables which have been varied. The table is referenced when the functions are processed so that only those functions which include varied data as the variables are processed.

In accordance with the present invention, there is no need to process the functions at the constant time interval but the processing is performed only when the data of the variables have been varied, by referencing the table. Accordingly, in a real time monitoring system in which data of the variables such as market quotation information of the stocks and credits vary randomly and the variation is not frequent, the data processing speed of the system is remarkably improved compared to the known system. In accordance with the present invention, the time delay between the data input and the decision making based on the data is reduced.

The advantage of the present invention is further remarkable when the input data is grouped or the corresponding functions to the grouped data are divided. Where the input data is time series data, the time serial data is divided into a present data component and a past data component, and a calculation result stored in a memory area is used for the past data component and the processing is performed only for the present data component. As a result, the data processing speed is improved and the advantage of the present invention is prominent.

In accordance with the present invention, high speed data processing with the same precision can be attained with a conventional data processing system having a relatively low processing speed, and the time delay between the data input and decision making ca be reduced even in such a case.

BRIEF DESCRIPTION OF THE DRAWINGS

FIG. 3A illustrates information error transition of support information for decision making based on status, in status monitoring of market quotation, FIG. 3B illustrates information error transition of support information for decision making based on status, in tracking processing, FIG. 4 shows a format of a status management table, FIG. 11 shows a format of a management table when a correlation coefficient is used.

DESCRIPTION OF THE PREFERRED EMBODIMENTS

Figure 1:
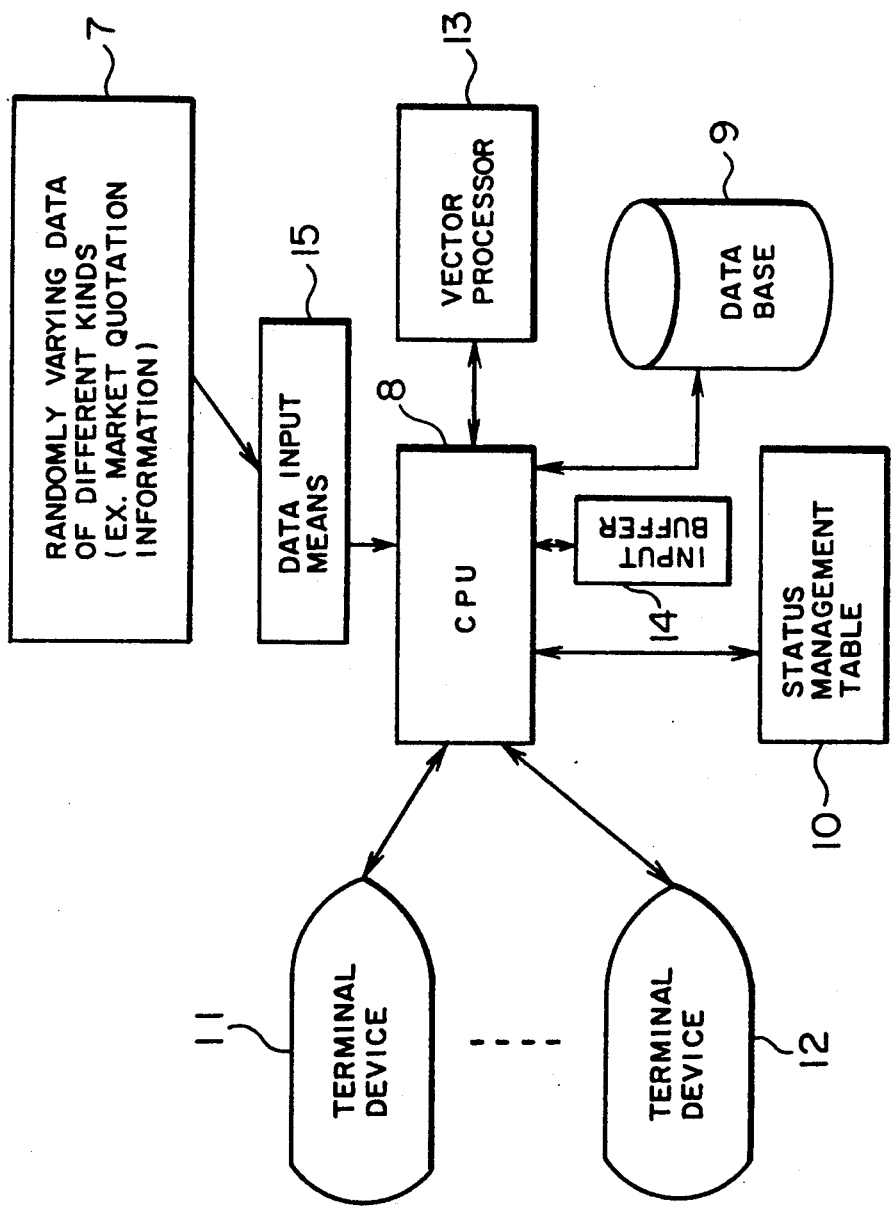
FIG. 1 shows a configuration of one embodiment of a real time status monitoring system of the present invention.
Figure 2:
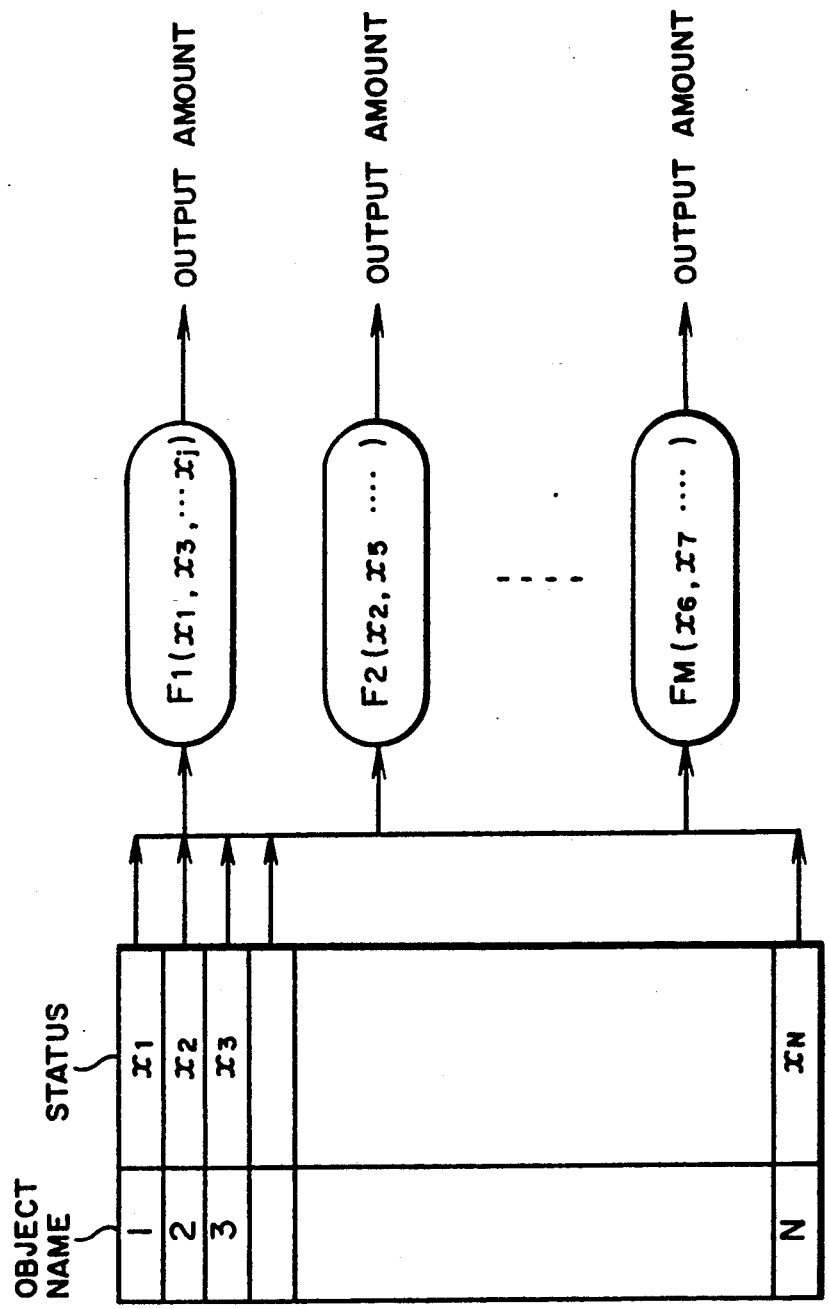
FIG. 2 illustrates a relationship between objects to be monitored and decision making support processing.

FIG. 1 shows a system configuration of a real time status monitoring system of the present invention which is applied to a portfolio status monitoring system for calculating a current total price of the portfolio based on market quotation variation information of the stocks and credits and issuing warning when it is smaller than an expected current total price (guaranteed current total price).

A central processing unit 8 receives market quotation information informed from a field 7 such as a securities exchange, that is, randomly varying data relating to objects of different kinds, processes various functions (for example, calculation of profit and loss of the retained portfolio, and displays the result on terminal devices 11 and 12. A data base 9 contains time serial data of the market quotation and information associated with the portfolio. A status management table 10 is a main part of the present invention and detail thereof is shown in FIG. 4. In FIG. 4, in a vertical direction, firm names $M_i$ ($i=1\sim m$), a current total amount change flag, a current total amount and a guaranteed current total amount for checking the status of the portfolio are arranged. On the other hand, in a horizontal direction, portfolios $F_i$ ($i=1\sim n$), a price change flag (data change flag) and current prices (current stock prices of firms) $P_i$ ($i=1\sim m$) are arranged. An element $\omega_{ij}$ in the matrix management table indicates the number of retained stocks or credits of the firm $M_i$ of the portfolio $F_j$.

For the convenience of explanation, in the status management table of FIG. 4, the firms (objects) are arranged vertically in the matrix ($M_i$, $i=1, \ldots m$), the portfolio names (functions) are arranged horizontally ($F_j$, $j=1, \ldots n$), and the elements of the matrix ($\omega_{ij}$, $i=1, \ldots m$, $j=1, \ldots n$) are zero when the functions $F_j$ do not use the data of $M_i$ and not zero when they do use the data of $M_i$. The $(n+1)$th column contains the price change flags (data change flags). If the price (data) $P_i$ changes in the predetermined time interval $\Delta T$, the matrix element $(i, n+1)$ is "1", otherwise it is "0". The $(n+2)$th column contains the current prices, that is, the current prices (data) of the objects $M_i$. The $(m+1)$th row contains the current total amount change (function processing) end flags. When the element $(m+1, j)$ is "1", it indicates that the updating of the data of the processing Fi is over, and when it is "0", it indicates that the updating of the data of the function processing Fi is not over.

Turning back to FIG. 1, a vector processor 13 rapidly calculates the current total amount by calculating an internal product of the column of the portfolio Fj and the current price.

The operation of the portfolio status monitoring system is now explained.

When the system receives the market quotation information from the field 7, it stores the information into an input buffer 14 and sets the data change flag (current price change flag) to "1". Then, it starts the processing shown in the flow chart of FIG. 5 at the time interval Δt (501).

Step 1: When the updating of the decision making support information (the current total amount and the guaranteed total amount in the (m+1)th and (m+2)th rows) is to be started, the following initialization is effected.

(i) Read the input buffer information for the (n+1)th column and the input buffer information for the (n+2)th column, from the input buffer 14 to the (n+1)th column and the (n+2)th column of the management table 10.

(ii) Clear the input buffer for the (n+1)th column to zero.

(iii) Clear the content of the (m+1)th row of the table 10 to zero.

(iv) Start the processing of the functions {Fi} starting from i=1.

Step 2: Check the content of the element (i, n+1) relating to the price change flag. If it is "0", it means no change in the data of Mi and the decision making supporting process relating to Mi is not necessary. Processing proceeds to a step 6. If the content of the element (i, n+1) is "1", it means that the data of Mi has been changed and the processing Fj for the steps 3 et seq should be initiated. Start the processing starting from j=1.

Step 3: Check the content of the element (i, j). If it is "0", it means that the processing F does not relate to the object Mi to be monitored. Processing proceeds to a step 5. If it is not "0", it means that the processing Fj relates to Mi. If the content of the element (m+1, j) is "1", it means that the processing Fj is over. If an AND function of the element (i, j) and the element (m+1, j) is "1", proceed to the step 5, otherwise, proceed to step 4.

Step 4: Perform the processing Fj in accordance with the status of the object to be monitored in the (n+2)th column. At the end of the processing, set "1" at the element (m+1, j) to indicate the end of the image updating.

Step 5: Set j to j+1. If j>n, go to step 6. If j≦n, go to the step 3.

Step 6: Set i to i+1. If i>m, end the process. If i≦m, go to the step 2.

Figure 5:
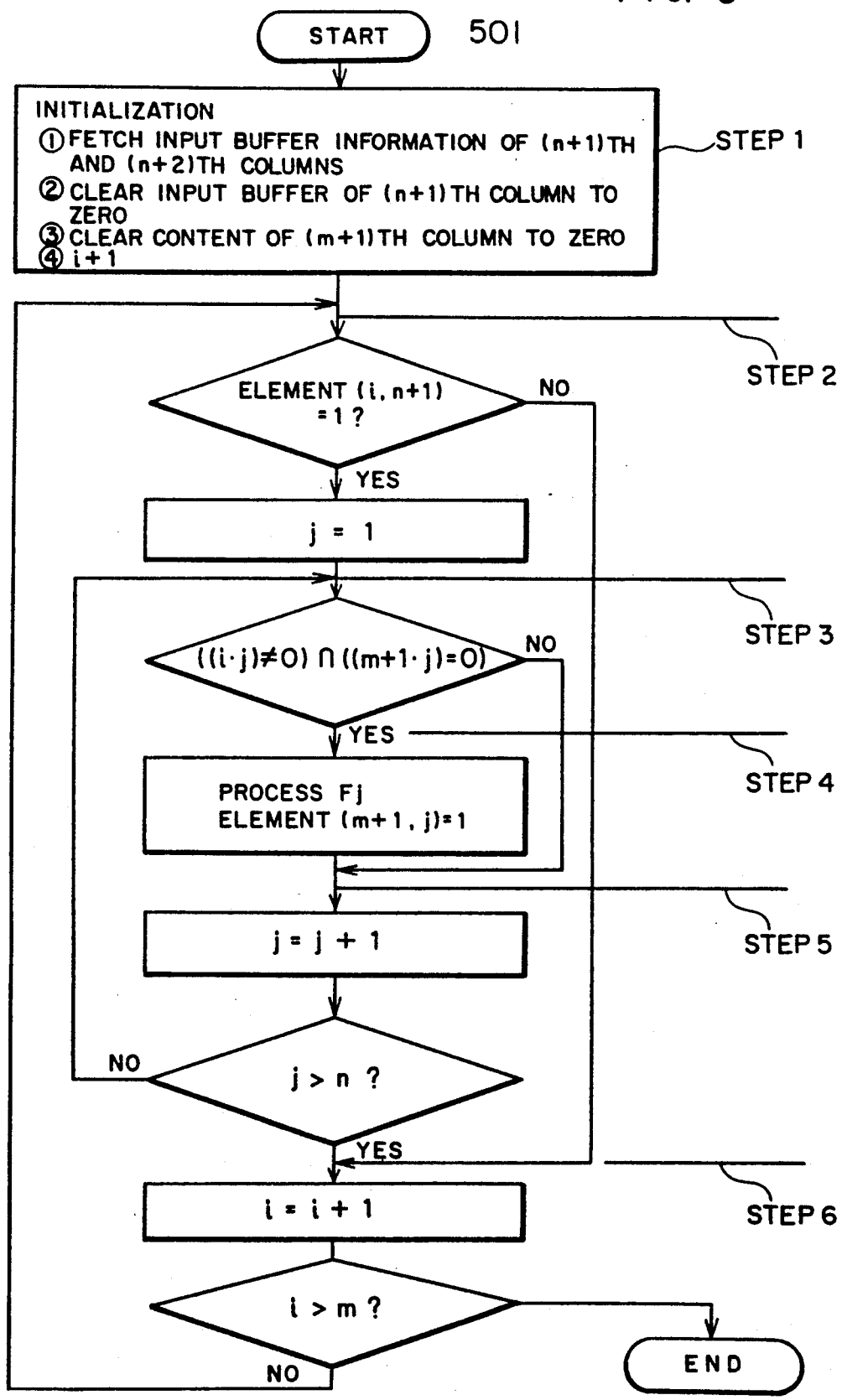
FIG. 5 shows a flow chart for a real time status monitoring processing method which uses the management table of FIG. 4, in accordance with an embodiment of the present invention.

In the processing of FIG. 5, the portfolio current total amount is calculated in step 3 by the vector processor in accordance with the calculation $$F_i = \Sigma \omega_{ij} \widetilde{P_i}$$

At the end of the processing, the current total amount change flag of the portfolio whose current total amount has been changed by the change of the current price of the firm has been set to "1". Accordingly, the current total amount Fi and the guaranteed current total amount gi are compared for those whose current total amount change flags have been set to "1". If Fi<gi, the current time, the portfolio name, the current total amount and the guaranteed current total amount are supplied to the terminal device as the warning message.

In this manner, the real time monitoring of the portfolio is attained.

Figure 6:
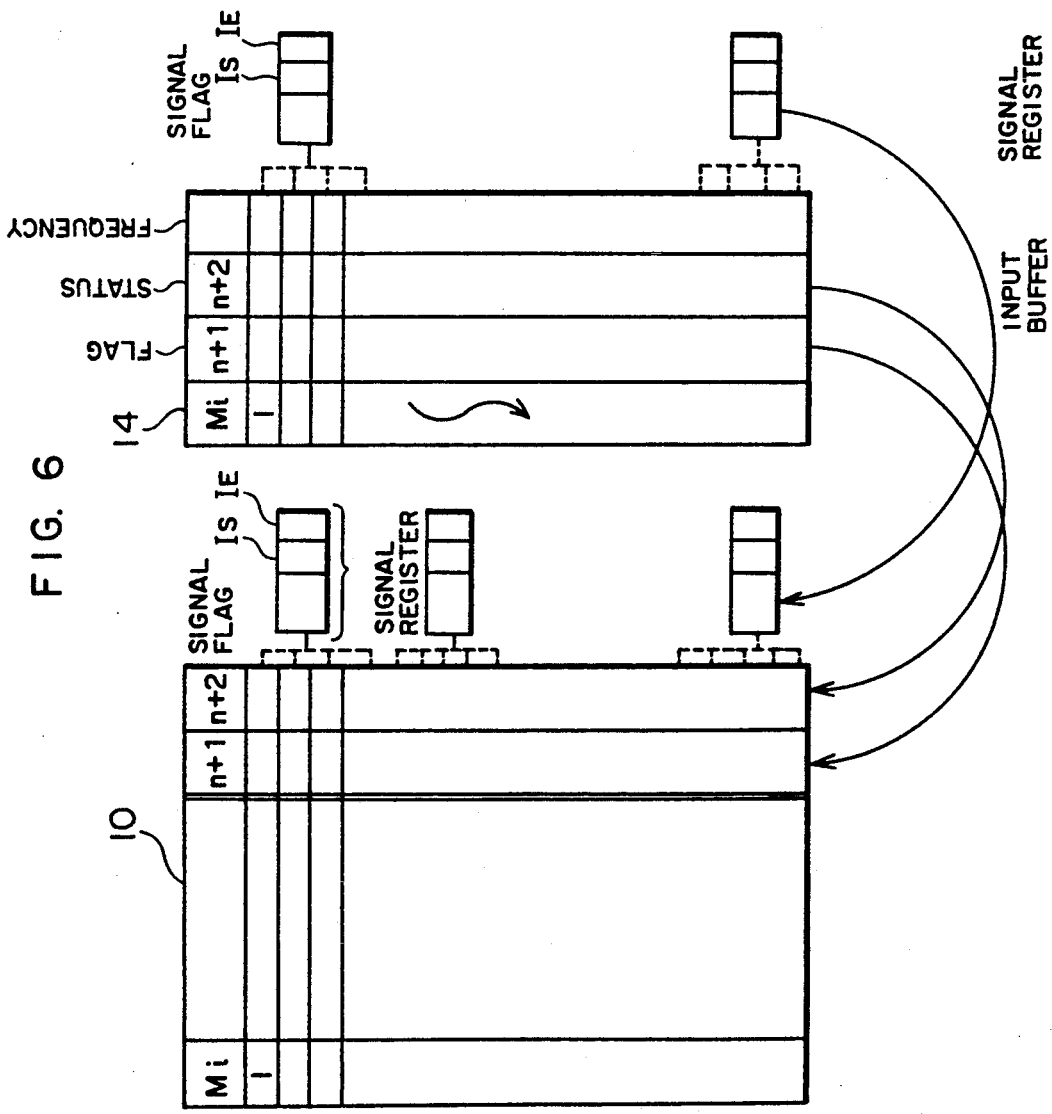
FIG. 6 shows a format of the status management table where detection of data change in the objects to be monitored is grouped.

FIG. 6 shows the contents of the status management table 10 used in another embodiment and the input buffer 14.

Of the huge number of objects to be monitored such as the variation of the market quotation of the stocks and credits, some objects have their data frequently changed and some other objects have their data not frequently changed. For those which have a low frequency of data change, it is desirable to make the number of times of checking the data change flag as small as possible. To this end, the data is efficiently grouped. In the embodiment shown in FIG. 6, the data change detection of the objects to be monitored is grouped.

As shown in FIG. 6, M signal registers each comprising a signal flag (ON="1", OFF="0"), a group top item number $I_S$ and a group bottom item number $I_E$ are added to each of the management table 10 and the input buffer 14, and measuring registers for the frequency for the respective objects to be monitored are added to the input buffer 14.

The objects Mi to be monitored are arranged in the descending order of the frequency of data change, and the objects to be monitored are grouped into groups each consisting of $N_I$ objects (I=1, . . . M) starting from the top object. A signal for detecting the data change in the group is prepared for each group. If all of the data change flags of the objects in the group are "0", the signal flag for the group is "0", otherwise it is "1". Thus, the signal flag is checked and if it is "0", it may be determined that no data change is included in the objects of the group without checking are the data change flag of the group. Only when the signal flag is "1", the data change flags of the objects in the group checked.

The number of times $K_1$ checks when no grouping is effected is given by $$K_1 = m + \sum_{i=1}^{m} P_i \cdot n$$

where Pi is a probability of data change in the time interval ΔT of the object Mi. An expectation value $K_2$ for the number of times of check when the plurality of signal flags are provided is given by $$K_2 = M + \sum_{I=1}^{M} \left( N_I + \sum_{i=I_S}^{I_E} P_i \cdot n \right) \cdot Q_I$$

where $I_S$ and $E_E$ are the item number i of the top object Mi to be monitored in the I-th group and the item number i* of the last object Mi* to be monitored, and $$I_S = \sum_{K=I}^{I-1} N_K + 1,$$

$$I_E = \sum_{K=1}^{I} N_K, \text{ and}$$

$Q_I$ is a probability that the signal flag for the detection of the status change in the I-th group is "1", that is, $$Q_I = 1 - \prod_{i=I_S}^{I_E} (i - P_i)$$

It should be smaller than $K_1$, and $K_2$ should be minimum. The value of $K_2$ depends on the number of signal flags and the grouping method if the probability of the status change is larger when the item number is smaller. Accordingly, it is necessary to monitor the occurrence of the status change of the objects $M_i$ to be monitored and optimize the grouping based on it. If the grouping is not proper, the number of times of check increases.

The processing method of the present embodiment which uses the table 10, the input buffer 14 and the signal registers is explained for the following three steps.

(1) Data Change Input of the Object to be Monitored

Since the data change in the object to be monitored is informed from time to time, the flag of the input buffer 14 corresponding to the informed firm Mi is set to "1", the status amount is stored, the data change frequency register is counted up, and the corresponding signal flag is set to "1".

(2) Information Processing {Fj}

The updating of {Fj} for each period is effected in the following manner.

Step 1: The following initialization is effected.
(i) Read the input buffer information for the (n+1)th column, the input buffer information for the (n+2)th column and the signal flag into the corresponding area of the management table.
(ii) Clear the content of the signal register corresponding to the input buffer for the (n+1)th column to zero.
(iii) Clear the content of the (m+1)th row to zero.
(iv) Set I to "1" and start the process.

Step 2: If the content of the I-th signal register is "0", it means that no data change has occurred in the objects of the group. Proceed to a step 4. If the content of the signal register is "1", set i to $I_S$ and start the process from a step 3.

Step 3: Carry out the steps 2 to 5 of FIG. 5.

Step 4: Set i to i+1. If $i \leq N_I$, go to the step 3, and if $i > N_I$, go to a step 5.

Step 5: Set I to I+1. If $I \leq M$, go to the step 2, and if $I > M$, terminate the information updating.

(3) Optimization of Grouping

It is important in reducing the number of times of check how the objects to be monitored are grouped. This is done by a batch process after the status monitoring. The process is carried out in the following manner.

Step 1: A probability Pi of the status change in the updating time interval $\Delta T$ is determined based on a total time $T_o$ of the status monitoring and a frequency $\alpha_i$ of the input buffer.

$$P_i = \frac{\alpha_i}{T_o} \Delta T$$

Step 2: Sort the objects of the management table in the descending order of Pi. Thus, the content of the management table is changed.

Step 3: Optimize the grouping so that the value $K_2$ is minimized.

Step 4: Store the top item number and the bottom item number of each group into $I_S$ and $I_E$ after the optimization of the grouping.

The speed-up when the process is divided as the objects are grouped is now explained.

When the processing Fj can be divided to $$Fj = fj_1 \oplus fj_2 \oplus \ldots \oplus fj_M$$

as the objects are grouped, only $fi_I$ whose signal flag representing the status change in the group I is "1" need be updated. In the above formula, $\oplus$ indicates that the processing Fi can be divided.

Figure 8:
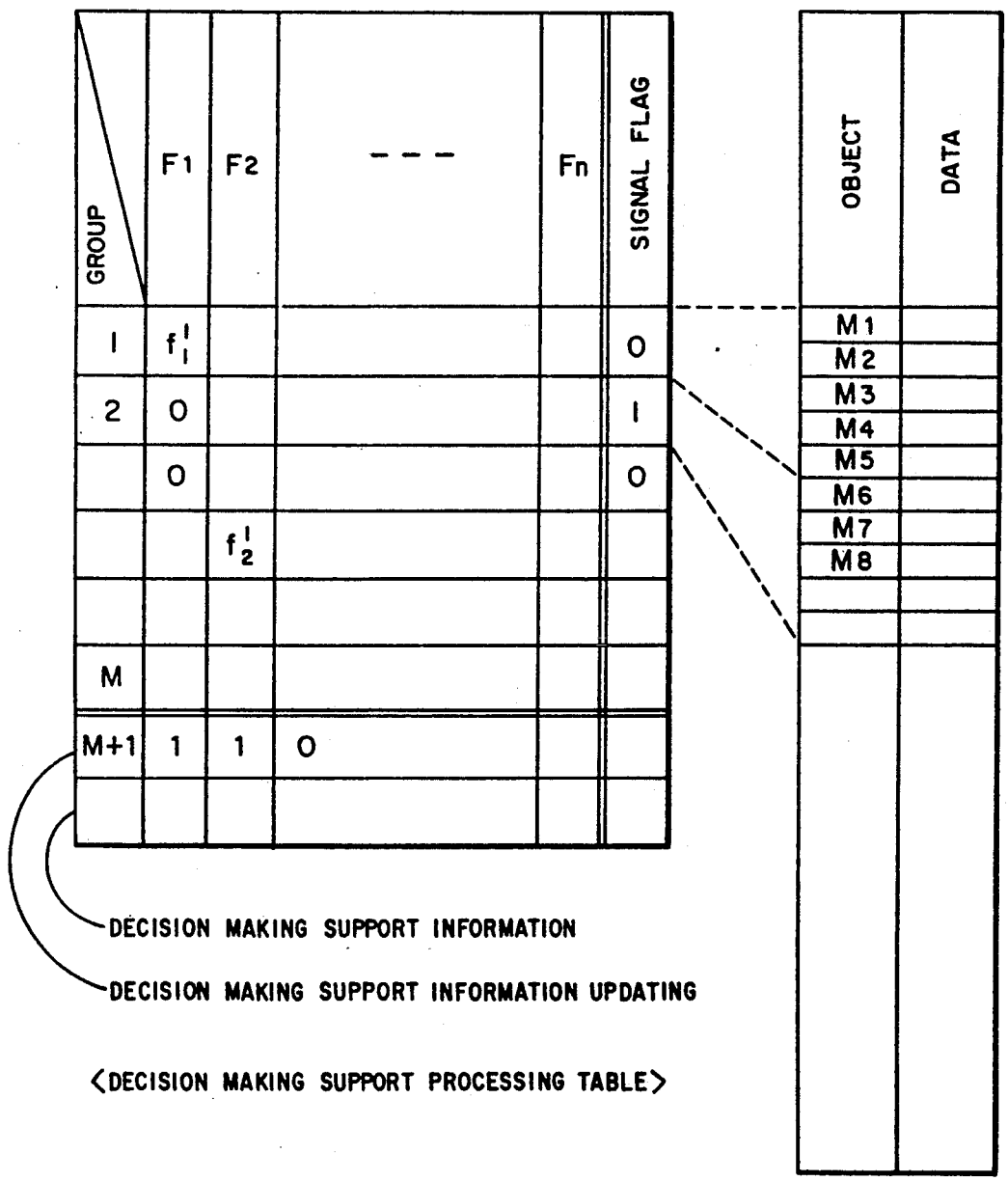
FIG. 8 shows a format of a management table used in high speed processing.

FIG. 8 shows a format of the management table used in the speed-up processing. In FIG. 8, the element (i, j) (i=1, ... M, j=1, .. n) of the matrix contains $fi^i$ when Fi requires to process $fj^i$ while using the information of the objects included in the group i, and contains "0" in other cases. The (n+1)th column contains the signal flags indicating the status change of each group. The (M+1)th row contains "1" if data of any one of $fj^I$ of the j-th column has been changed. The (M+2)th row contains the value of the final decision function Fj. The data of the object corresponding to each group is prepared separately from the management table.

Figure 7:
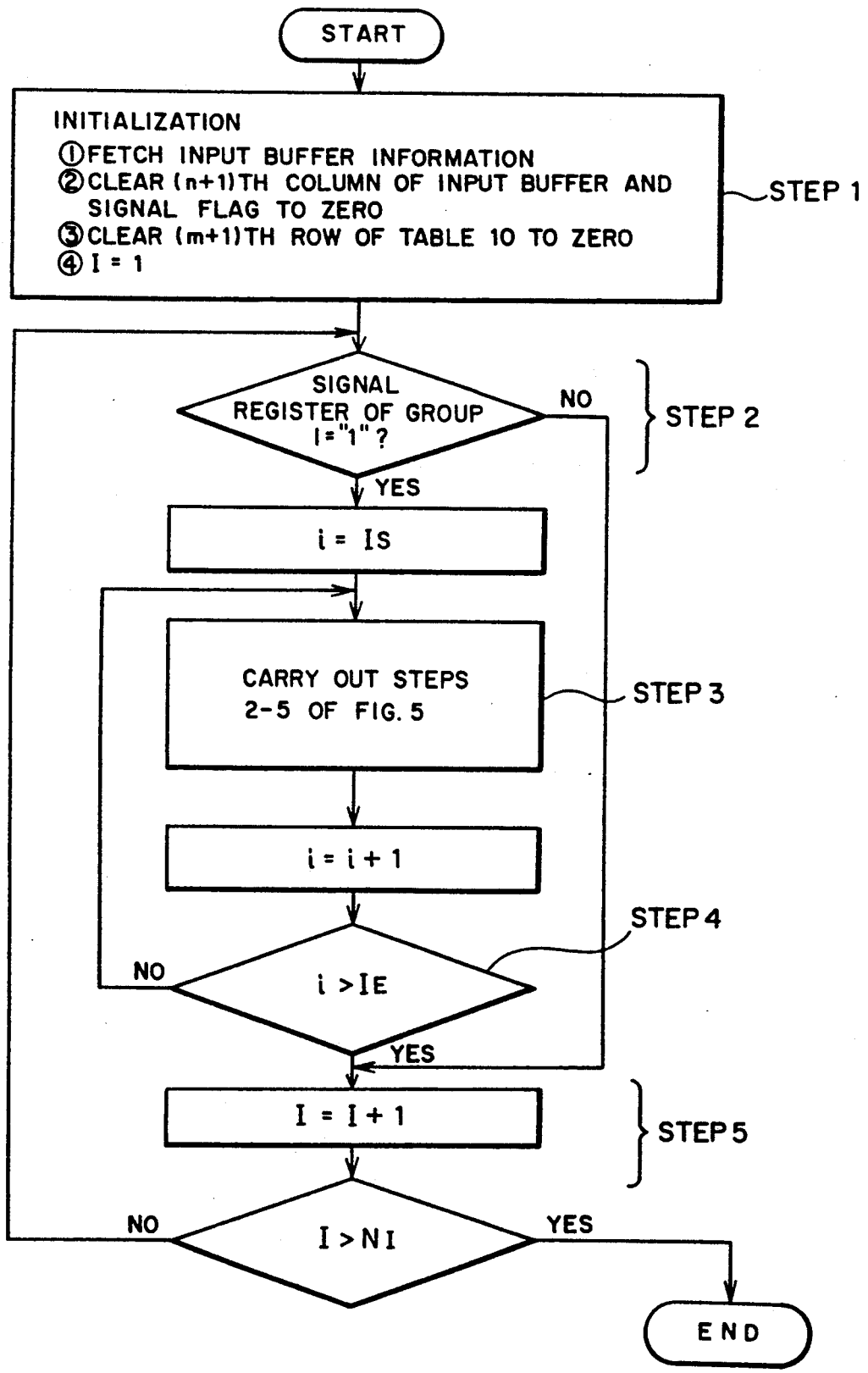
FIG. 7 shows a flow chart for a real time status monitoring processing method which uses the management table of FIG. 6, in accordance with another embodiment of the present invention.
Figure 9A:
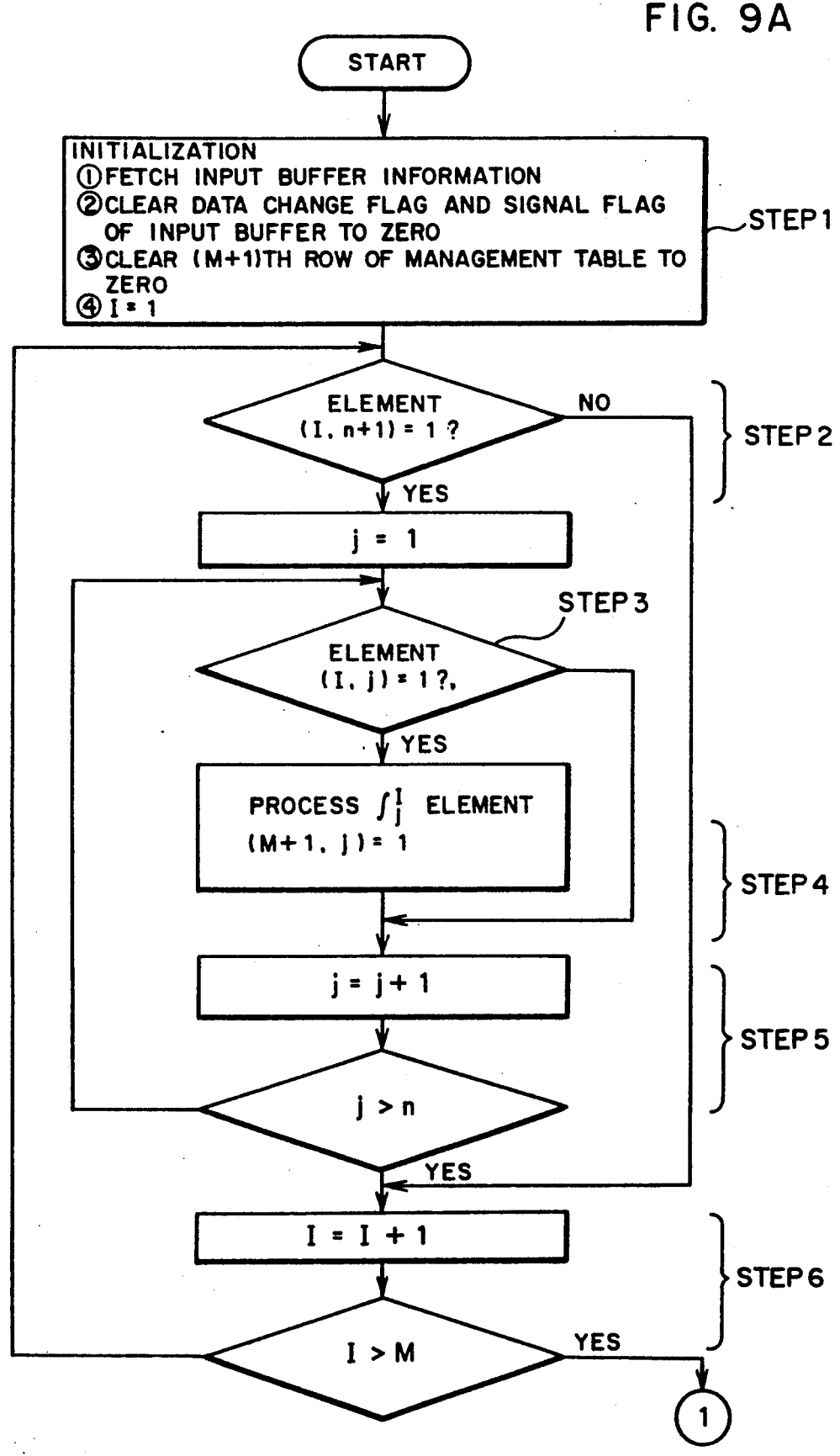
FIG. 9A shows a flow chart for a real time status monitoring processing method which uses the management table of FIG. 8, in accordance with another embodiment of the present invention.
Figure 9B:
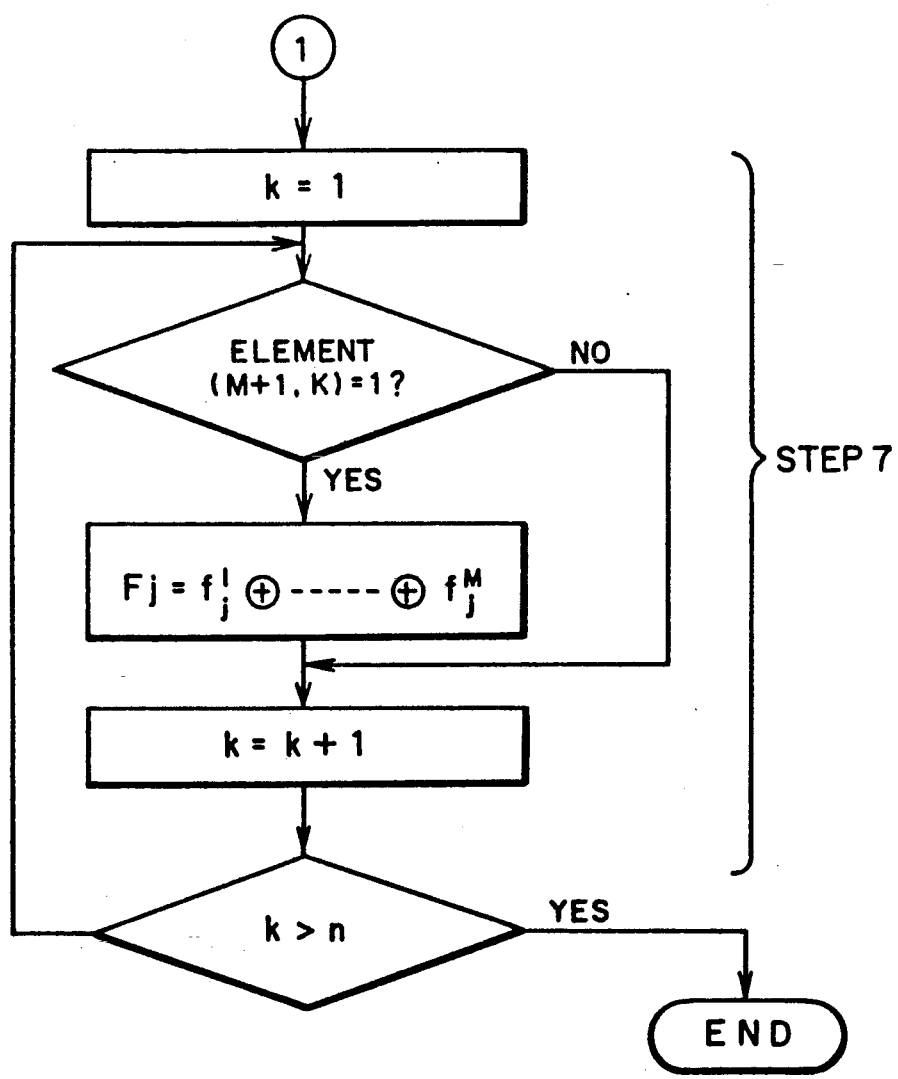
FIG. 9B shows a flow chart which continues from FIG. 9A.

The function of the input buffer 14 and the method for fetching data from the input buffer are the same as those in the processes of FIGS. 6 and 7. The updating of the decision making support information is carried out in the following manner as shown in FIG. 9.

Step 1: Carry out the initialization as follows.
①Fetch input buffer information
②Clear the data change flag of the input buffer and the signal flag of each group to zero.
③Clear the (M+1)th row of the management table to zero.
④Set I to "1" and start the following steps.

Step 2: If the element (I, n+1), that is, the signal flag of the group is "0", it means that there is no change in the objects of the group. Go to a step 6. If the element (I, n+1) is "1", set j to "1" and go to step 3.

Step 3: If the element (I, j) is "0", it means that there is no process related to the group I in Fj. Go to a step 5. If the element (I, j) is "1", it means that the processing of $fj^I$ is required. Go to a step 4.

Step 4: Process $fj^I$, store the result in the element (I, j) and set the decision making support information updating flag by setting the element (M+1, j) to "1".

Step 5: Set j to j+1. If j>n, go to a step 6. If $j \leq n$, go to a step 3.

Step 6: Set I to I+1. If I>M, go to a step 7. If $I \leq M$, go to a step 2.

Step 7: For all Fj whose elements (M+1, j) are "1", process Fj such that $$Fj = fj^1 \oplus fj^2 \oplus fj^3 \oplus fj^4 \oplus \ldots \oplus fj^M$$

The expansion to the case where the time serial data processing is required is now explained.

In the support system for the decision making based on the situation like the trading support system aimed by the present invention, the time serial data is frequently handled. The time serial data processing $G_K$ includes a portion which requires current real time information and a portion which uses only past time serial data. When the time serial data processing can be divided into $$G_K = G_K^R \oplus G_K^P$$

where $G_K^R$ is a portion which depends only on the real time status change and $G_K^P$ is a portion which depends only on the past time serial data, the processing time can be significantly reduced by precalculating the $G_K^P$ and calculating only $G_K^R$ corresponding to the status change on request basis. An embodiment of the real time decision making supporting processing in which the decision making support processing Fj requires the time serial data processing and it can be divided into $$Fj = (fj)^R \oplus (fj)^P$$

where $(fj)^R$ is the portion corresponding to the status change and $(fj)^P$ is the portion which depends on the past time serial data, and $(fj)^R$ can be divided into $$(fj)^R = (fj^1)^R \oplus (fj^2)^R \oplus \ldots \oplus (fj^M)^R$$

to correspond to the grouping of the objects, is explained below.

Figure 10:
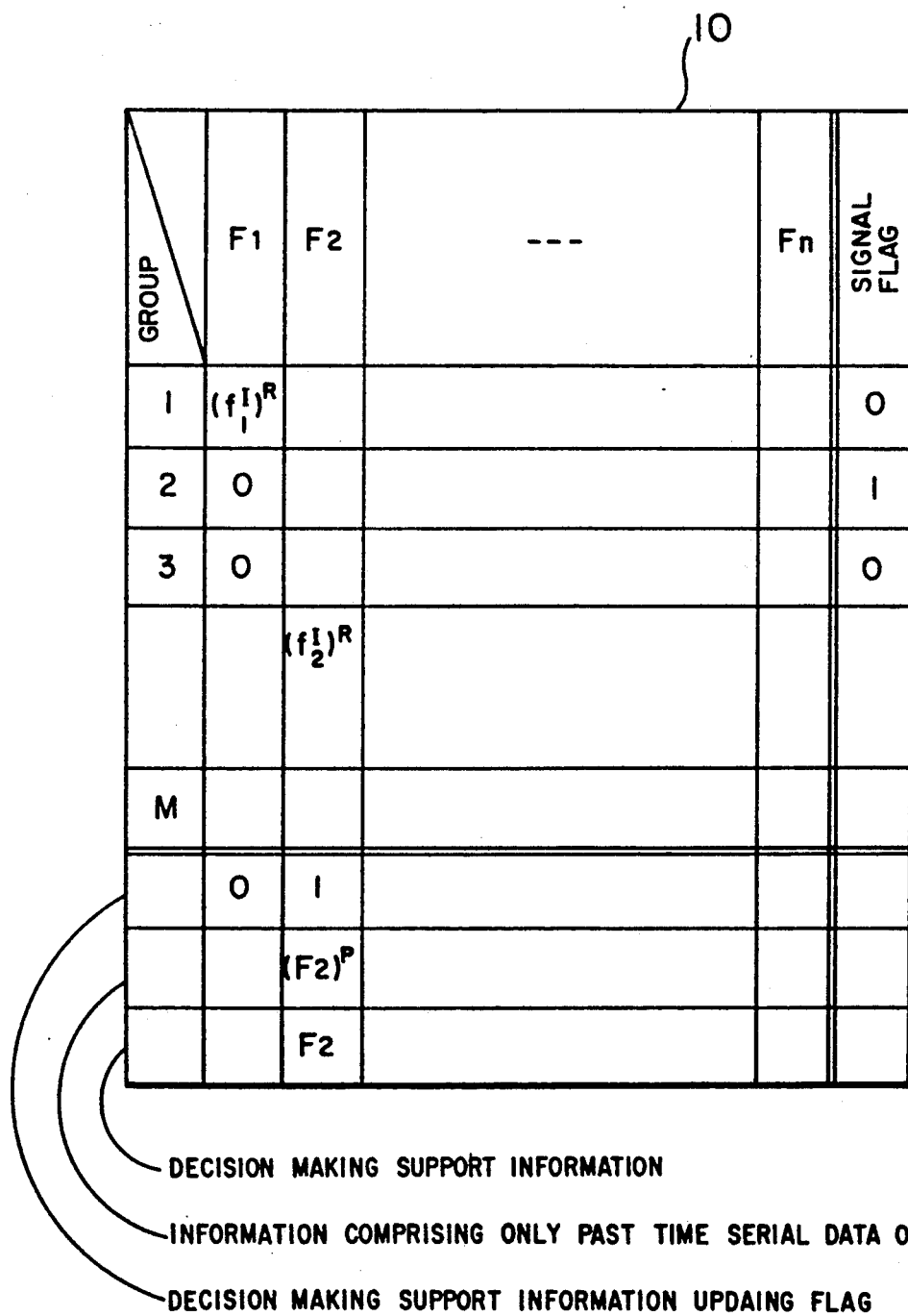
FIG. 10 shows a format of a management table used for time serial data processing.
Figure 12:
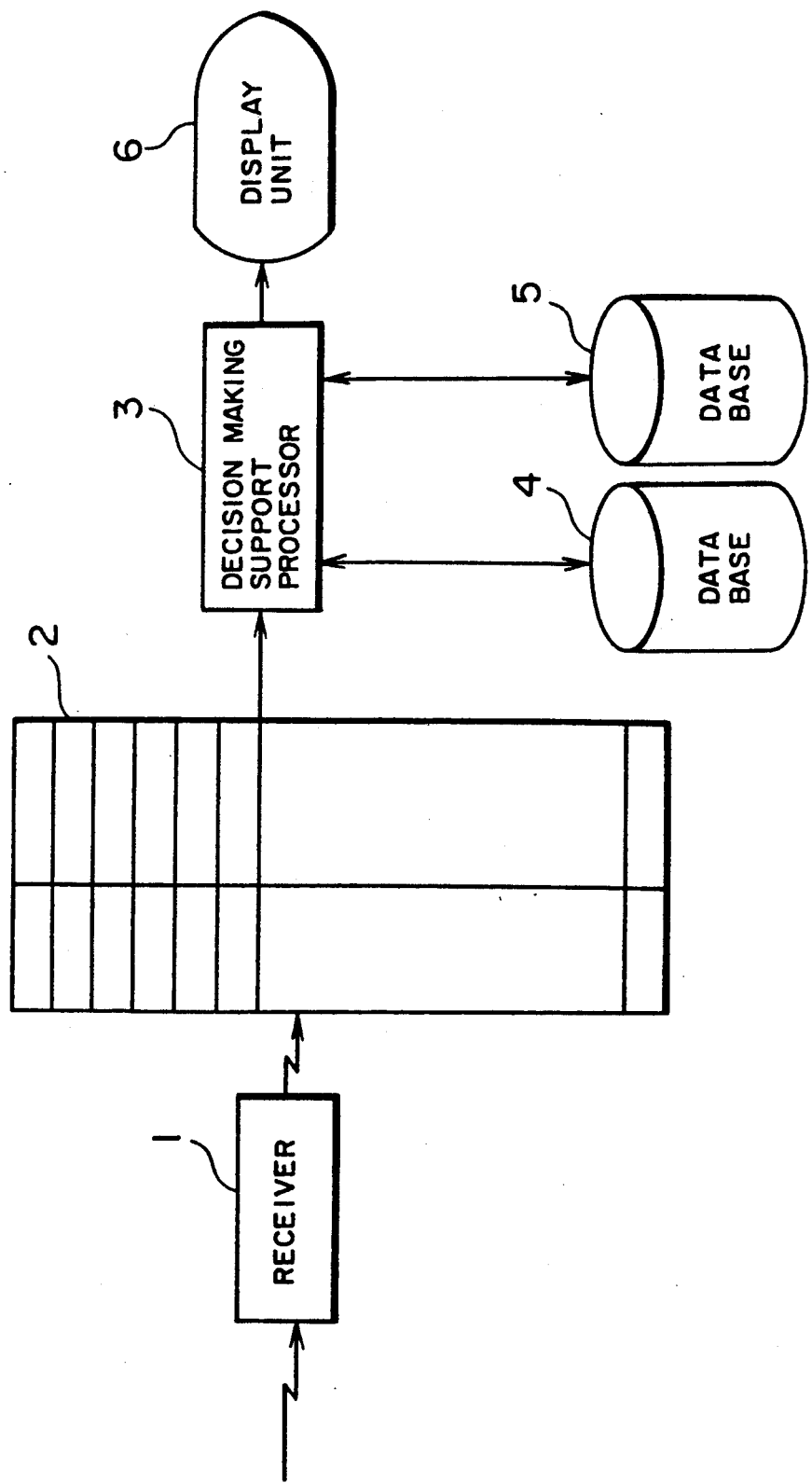
FIG. 12 shows a general conceptual chart of the real time status monitoring method and the apparatus therefor.

FIG. 10 shows a format of the management table 10 used in the embodiment for the real time processing of the time serial data which requires the past data and the current data. It differs from FIG. 8 in that:

(i) a row for storing $(Fj)^P$ which comprises only the past time serial data is provided, and (ii) The content of the element (I, j) is changed from $fj^I$ to the processing $(fi^I)^R$ which depends only on the real time information.

The processing when the management table of FIG. 10 is used is substantially identical to the flow shown in FIG. 9. The differences are:

(i) The calculation step for $fj^I$ in FIG. 9 is changed to the calculation step for $(Fj^I)^R$ based on only the real time information.

(ii) The calculation step for $$Fj = fj^1 \oplus fj^2 + \ldots \oplus fj^M$$

in FIG. 9 is changed to the calculation step for $$Fj = (Fj)^P \oplus (fj^1)^R \oplus (fj^2)^R \oplus \ldots \oplus (fj^M)^R$$

by using $(Fj)^P$ calculated based on the past data stored in the table.

An embodiment of the present invention which calculates a correlation coefficient to a market variation of the retained portfolio on the real time basis is now explained. A market variable is usually represented by a stock price index and it is informed as one of marked quotation information. It is stored in the data base 9 of FIG. 1 as the time serial data (daily closing price). The time serial data string is given by $$(x_0, x_1, \ldots x_N)$$

where $x_0$ is a stock price index under the current situation. On the other hand, the current total amount fj of the portfolio j is given by $$Fj = \sum_i \omega ijPj$$

The time serial data of Fi is given by $$(y_0, y_1, \ldots y_N)$$

where $y_0$ is the value of the portfolio under the current situation, and $y_1, y_2, \ldots$ are calculated based on the daily closing stock prices of the firms, and the results thereof are stored in the data base. The correlation coefficient $\gamma j$ is given by $$\gamma j = \frac{\sum_{i=0}^{N} x_i \cdot y_i}{\sqrt{\sum_{i=0}^{N} x_i^2} \sqrt{\sum_{i=0}^{N} j^2}}$$

It is divided into the portion calculated based on the current status data and the portion calculated based on the past data.

$$\gamma j = \frac{x_0 y_0 + \sum_{i=1}^{N} x_i \cdot y_i}{\sqrt{x_0 + \sum_{i=1}^{N} x_i^2} \sqrt{y_0 + \sum_{i=1}^{N} y_i^2}}$$

The portions which depend on the past data are represented by $$A^1 = \sum_{i=1}^{N} x_i y_i$$

$$A^2 = \sum_{i=1}^{N} x_i^2$$

$$A^3 = \sum_{i=1}^{N} y_i^2$$

Since $y_o$ is calculated based on the current price Pi of the object in the following manner $$y_o = \sum_i \omega ijPi$$

the management table shown in FIG. 11 which is a merged one of FIGS. 4 and 10 is utilized. Namely, a table which contains $y_o$ (portfolio current total amount), $Ai^3$, $x_o y_o$, $Ai^1$, x and $Ai^2$ is added to the management table of FIG. 4. The processing which uses the table of FIG. 11 is explained below.

(1) Preprocessing

Before the real time status monitoring of the objects is started, the content of the elements (i, j) (i=1, ..... m, j=1, ..... n) of the matrix as well as $A^1$, $A^2$, $A^3$ are stored by utilizing the past time serial data.

(2) Real Time Status Monitoring

The process of calculating the change flag for $y_o$, and $y_o$ by noting the price change flag is the same as that of FIG. 5. After the change flag for $y_o$, and $y_o$ have been calculated, the following steps are carried out.

Step 1: If the status change flag to $x_o$ is "1", go to a step, otherwise go to a step 3.

Step 2: Calculate $x_o y_o$ as the product of $x_o$ and $y_o$ for j=1, ..... m. Then, calculate $$\gamma_j = \frac{(x_o y_o + A_j)}{\sqrt{x_o^2 + A_j^2} \sqrt{y_o^2 + A_j^3}}$$

for $j = 1, \ldots, n$

Step 3: Calculate $x_o y_o$ for only those whose change flags for $y_o$ are "1", and update $\gamma_j$ by the above formula.

In this manner, the correlation coefficient $\gamma_j$ can be calculated on the real time basis.

While the trading support system based on the market quotation information in the financial and security field has been described above, the present invention is applicable to any real time status monitoring system and method.

In accordance with the present invention, the processing is done only for those objects whose data have been changed as opposed to the checking of all status at a constant time interval as is done in the multi-target tracking. Accordingly, not only the data amount to be processed is reduced but also the overall status of the object under the varying status can be easily grasped because it is easy to determine which decision making support information has been changed.

The present invention is effective to the system which monitors on the real time basis the function values which vary with the status of randomly changing data of different kinds.

We claim:

1. A real time status monitoring method, the method comprising the steps of:
   inputting randomly varying data relating to a plurality of types of objects;
   preparing a real time status management table indicating which ones of the data are used as variables by a plurality of functions;
   generating data change flags indicating which of the ones have been inputted by detecting reception of the data;
   determining the variables which are subjects of processing due to the data reception and types of the functions which include the variables based on the data change flags and a function processing and flag indicating that the processing of the functions has been completed;
   processing only those functions which include the variables which are subjects of processing due to the data reception, based on a result of the determining;
   generating the function processing end flag indicating that the processing of the functions has been completed for the ones of the data, based on the processing of the functions; and
   displaying the processing result of the functions.

2. A real time status monitoring method according to claim 1, wherein said data comprises market quotation information in financial and security fields.

3. A real time status monitoring method, the method comprising the steps of:
   inputting randomly varying data relating to a plurality of types of objects;
   grouping the data;
   preparing and grouping real time status management tables indicating which ones of the data comprise variables for a plurality of functions;
   generating group data change flags indicating which grouping of the data has been changed by detecting reception of the data;
   determining the variables which are subjects of processing due to data reception and types of functions which include the variables based on a function processing end flag indicating on which ones of the data the processing of the functions has been completed, and the group data change flags;
   processing only those functions which include the variables which are subjects of processing due to the data reception, based on the determining;
   generating the function processing end flag indicating on which ones of the data the processing of the functions has been completed; and
   displaying a processing result of the functions.

4. A real time status monitoring method according to claim 3 wherein said data are grouped in accordance with a frequency of data change for the plurality of types of objects.

5. A real time status monitoring method, the method comprising the steps of:
   inputting randomly varying data relating to a plurality of types of objects,
   grouping the data;
   dividing a plurality of functions including some of the data as variables into a plurality of types of sub-functions in accordance with the grouping of the input data;
   preparing a management table indicating which ones of the sub-functions the functions use for processing;
   generating signal flags indicating which ones of the sub-functions have a data reception;
   determining which sub-functions are subjects of processing and types of functions which include such sub-functions based on a decision making support information change flag indicating on which ones of the sub-functions the processing of the function has been completed and the signal flags;
   processing only those functions which include the sub-functions which are subjects of processing due to the data reception, in accordance with the determining;
   generating the decision making support information change flag indicating which ones of the sub-functions the processing of functions have been completed; and
   displaying a processing result of the functions.

6. A real time status monitoring method, the method comprising the steps of:
   inputting randomly varying time serial data relating to a plurality of types of objects;
   dividing the time serial data into a first data component relating to current real time data and a second data component relating only to past time serial data;
   preparing a management table indicating if the first data component and the second data component comprise variables for a plurality of functions for processing;
   generating data change flags indicating which of the first and second data components have been inputted by detecting reception of the time serial data;
   fetching a processing result for the second data component from a memory area;
   processing the first data component, when the first data component is determined to be a subject for processing due to the data reception, based on the data change flags;

processing the functions by consolidating the processing result for the first data component and the processing result for the second data component by using the management table; and displaying a processing result of said processing the functions.

7. A real time status monitoring system comprising:
a central processing unit;
means for inputting to said central processing unit randomly varying data relating to a plurality of types of objects;
a vector processor for processing a plurality of functions having the data as variables; and
a terminal device for displaying a processing result for the functions;
wherein said central processing unit includes a real time status monitoring means comprising:
means for preparing a real time status management table indicating presence and absence of data and presence or absence of variables comprising a newly received data item in the functions;
means for generating data change flags indicating which of the data and which of the variables comprise the newly received data item; and
means for processing only those functions having the data change flags in accordance with the real time status management table.

8. A real time status monitoring system comprising:
a central processing unit;
input means for inputting to said central processing unit randomly varying data relating to a plurality of types of objects;
an input buffer for temporarily storing the input data supplied to said central processing unit;
status management table preparation means for preparing, under control of said central processing unit, a real time status management table indicating which ones of the input data a plurality of functions use as variables for processing and for generating a data reception flag upon reception of the input data;
a data base for storing a method for preparing the status management table and the functions;
a vector processor for processing the functions according to the status management table and the data reception flag;
a terminal device for displaying a processing result.

9. A real time status monitoring system comprising:
a central processing unit;
means for inputting to said central processing unit randomly varying data relating to a plurality of types of objects;
a vector processor for processing a plurality of functions having the data as variables;
a measurement register for measuring a frequency of updating of the data for a purpose of grouping; and,
a terminal device for displaying a processing result for the functions;
wherein said central processing unit includes a real time status monitoring means comprising:
means for preparing a real time status management table indicating presence or absence of data and presence or absence of variables comprising a newly received data item in the functions; and,
means for processing only those functions which include the variables comprising the newly received data item in accordance with the real time status management table.

10. A real time status monitoring method, the method comprising the steps of:
inputting randomly varying data relating to a plurality of types of objects,
grouping the data, said data being grouped in accordance with a frequency of data change for the plurality of types of objects;
preparing and grouping real time status management tables indicating which ones of the data a plurality of functions use as variables;
generating group data change flags indicating which group data of said data have been changed by detecting reception of the inputted data;
determining the variables which are subjects of processing due to data reception and types of functions which include such variables based on a function processing end flag indicating on which ones of the data the processing of the functions has been completed, and the group data change flags;
processing only those functions which include the variables which are subjects of processing due to the data reception, based on the determining;
generating the function processing end flag indicating on which ones of the data the processing of the functions has been completed; and
displaying a processing result of the functions.

11. A real time status monitoring system comprising:
a central processing unit;
means for inputting to said central processing unit randomly varying data relating to a plurality of types of objects;
a vector processor for processing a plurality of functions having the data as variables;
a measurement register for measuring a frequency of updating of the data for a purpose of grouping; and
a terminal device for displaying a processing result for the functions;
wherein said central processing unit includes a real time status monitoring means comprising:
means for preparing a real time status management table indicating the presence and absence of data and the presence or absence of a new data reception of the variables; and
means for processing only those functions which include the variables of the new data reception in accordance with the real time status management table.

* * * * *